US008297908B2

(12) United States Patent
Savoia et al.

(10) Patent No.: US 8,297,908 B2
(45) Date of Patent: Oct. 30, 2012

(54) AUTOMATED SYSTEM FOR THE IN-LINE INVERTING, TRANSFERRING AND FILLING OF LAB ANIMAL CONTAINMENT DEVICES IN AREAS WHERE THEY ARE WASHED

(75) Inventors: Luciano Savoia, Saronno (IT); Roberto Tosi, Luino (IT); Michele Vitali, Angera (IT)

(73) Assignee: IWT S.R.L., Casale Litta (IT)

( * ) Notice: Subject to any disclaimer, the term of this patent is extended or adjusted under 35 U.S.C. 154(b) by 395 days.

(21) Appl. No.: 12/613,008

(22) Filed: Nov. 5, 2009

(65) Prior Publication Data

US 2011/0070059 A1    Mar. 24, 2011

(30) Foreign Application Priority Data

Sep. 24, 2009   (IT) .............................. MI2009A1629

(51) Int. Cl.
  *B65H 15/00*     (2006.01)
  *B65H 15/02*     (2006.01)
  *B65G 47/252*    (2006.01)
(52) U.S. Cl. ..................... 414/766; 414/767; 198/403
(58) Field of Classification Search ............... 141/92;
    198/379, 403, 411, 413; 414/171, 403, 419,
    414/420–421, 618, 754, 763, 766, 767, 771,
    414/780, 783
See application file for complete search history.

(56) References Cited

U.S. PATENT DOCUMENTS

| 1,967,719 | A | * | 7/1934 | Morgan ......................... 414/419 |
| 2,125,548 | A | * | 8/1938 | Cowl ............................. 414/765 |
| 2,157,642 | A | * | 5/1939 | Vosler ........................... 198/379 |
| 2,772,766 | A | * | 12/1956 | Kellam .......................... 198/379 |
| 3,071,258 | A | * | 1/1963 | Seigh et al. ................... 414/766 |
| 3,184,079 | A | * | 5/1965 | Buccicone .................... 414/765 |
| 3,770,144 | A | * | 11/1973 | Frank et al. ................. 414/791.4 |
| 4,336,926 | A | * | 6/1982 | Inagaki et al. .................. 269/34 |
| 4,354,788 | A | * | 10/1982 | Giusti ......................... 414/791.3 |
| 4,467,893 | A | * | 8/1984 | Hobson ......................... 187/226 |
| 4,798,278 | A | * | 1/1989 | Cornacchia .................... 198/399 |
| 6,098,783 | A |   | 8/2000 | Erlandson et al. |
| 6,139,243 | A | * | 10/2000 | Jackson et al. ................ 414/405 |
| 6,398,008 | B1 | * | 6/2002 | Suga ............................. 198/404 |

FOREIGN PATENT DOCUMENTS

| DE | 3134573 | 3/1983 |
| EP | 0233657 | 8/1987 |
| EP | ITMI20091629 | 5/2010 |

* cited by examiner

*Primary Examiner* — Gregory Adams
(74) *Attorney, Agent, or Firm* — LeClairRyan, a Professional Corporation

(57) ABSTRACT

The present invention concerns an automated system for handling trays for containing animals in a lab animal room, and particularly for inverting the trays when they emerge from the tunnel washer.

One object of the present invention is thus a completely automated system comprising an inverter device associated with a system for moving the trays on rotating rollers and complete with stopper means capable of blocking the trays in their forward feed movement synchronized, by means of a central control unit, with the movements of an inverter device capable of managing trays of different shapes and sizes.

7 Claims, 6 Drawing Sheets

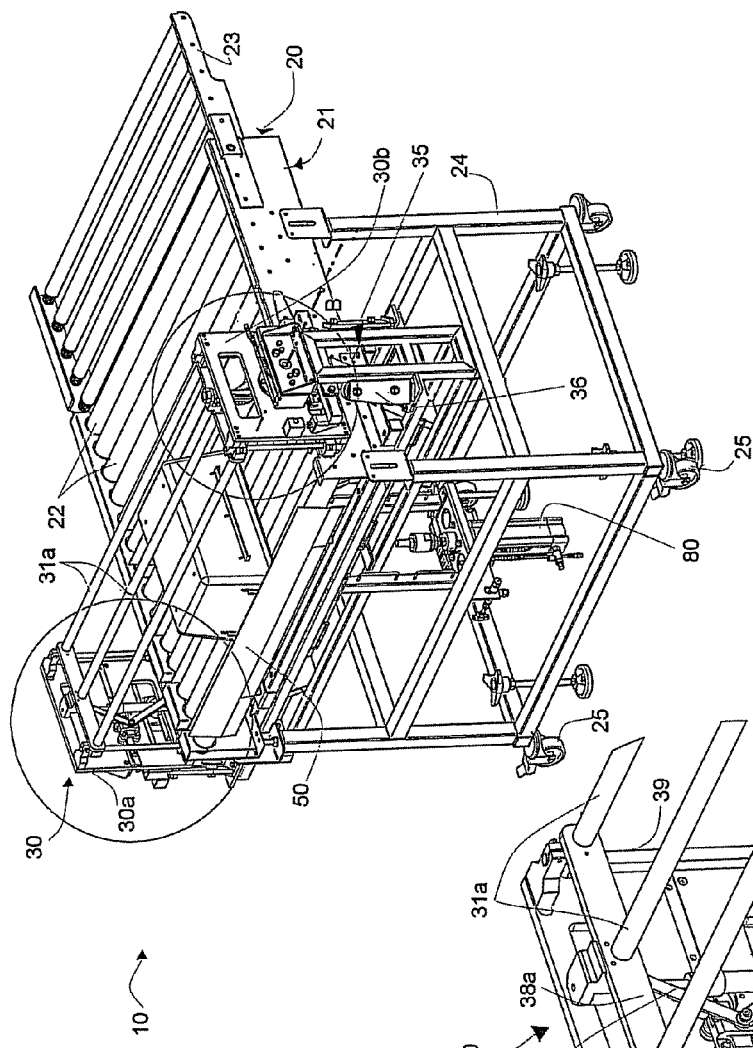
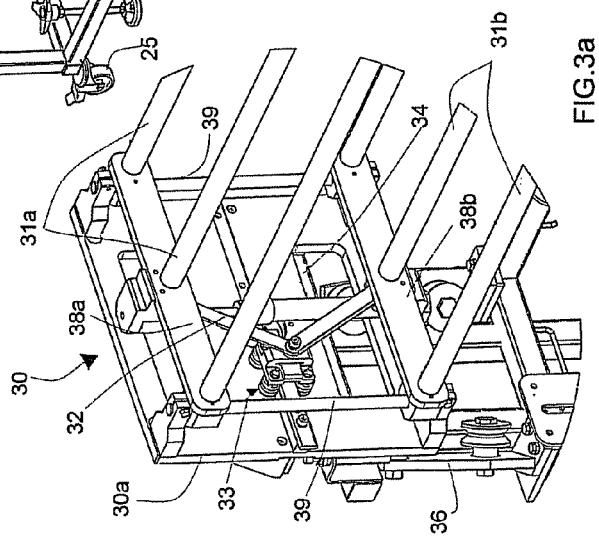
FIG.3
FIG.3a

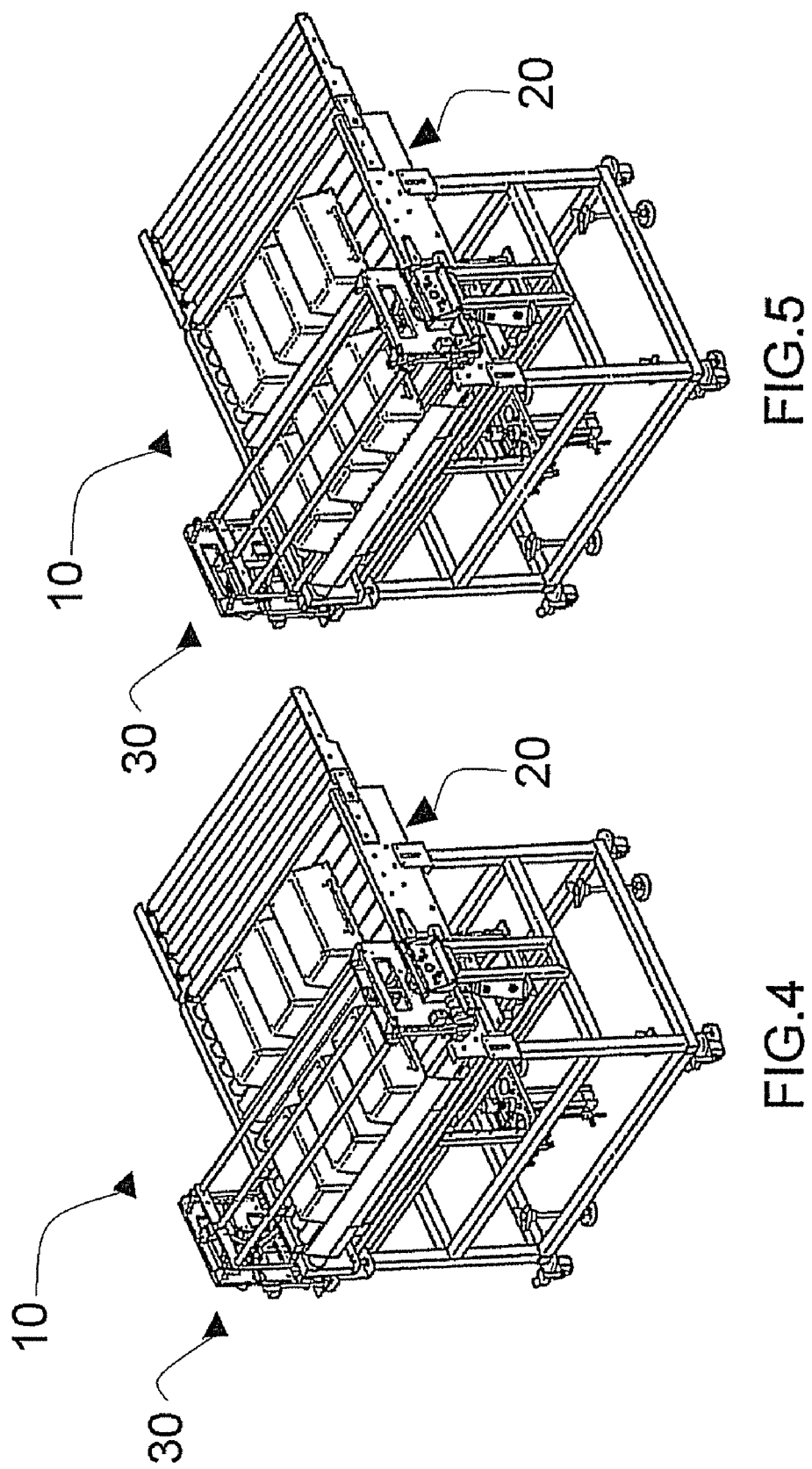

AUTOMATED SYSTEM FOR THE IN-LINE INVERTING, TRANSFERRING AND FILLING OF LAB ANIMAL CONTAINMENT DEVICES IN AREAS WHERE THEY ARE WASHED

CROSS REFERENCE TO RELATED APPLICATION

This application claims benefit under 35 USC 119 to Italian Application No. MI2009A001629, filed on Sep. 24, 2009.

FIELD OF THE INVENTION

The present invention concerns an automated system for handling, and particularly for inverting the animal containers used in lab animal rooms at pharmaceutical research laboratories.

More precisely, the animal containment devices in question consist of plastic containers generally comprising a tray suitable for containing the lab animals on a litter or bedding consisting of a suitable material, with a lid, also made of plastic. The container may also be complete with further components, such as a feeder.

PRIOR ART

It is common knowledge that for scientific experiments conducted on lab animals the environmental conditions of the lab animal room must be constantly controlled in order to guarantee optimal conditions for health and a high quality standard of living conditions for the animals. In this light, it is consequently clear that the hygienic conditions of the containers for housing the animals are an extremely important aspect, not only for the animals' living conditions, but also for the quality of the scientific research conducted.

The containers for housing the lab animals are consequently removed periodically from the shelves, emptied of the animals they contain and of any material serving as a litter or bedding, and accurately washed. Since this washing procedure must be extremely accurate and, depending on the size of the animal room, the number of containers may be quite considerable, there are known systems on the market for the automated washing of the containers that have the dual advantage of optimising the time it takes to wash them and of ensuring a very accurate cleaning of the containers.

In particular, because the part that needs to be cleaned most accurately is the tray, there are known washing systems specifically conceived to process the trays. In particular, there are known tunnel washers that comprise several stations and that require the manual positioning of the trays, by the operator or by means of robotic systems, on a conveyor belt that carries the trays through various stations where they are washed, dried and sanitised before they are refilled with clean bedding and made available again for use in the lab animal room. Before the trays are loaded on the tunnel washer conveyor belt, they are inverted so as to empty their contents and they are placed on the conveyor belt upside down, so that the cavity of the tray faces downwards. This avoids any fluid accumulating inside the tray when the water jets hit the trays during the washing procedure, which would have several drawbacks, including a more limited efficacy of the washing action, a pointless collection of water that would consequently be subtracted from the washing system, as well as the obvious need to empty the trays, one by one, when they come out of the tunnel washer.

In the known types of system, moreover, it is usually necessary for an operator to collect the trays from the conveyor belt at the outlet from the tunnel washer, turn them over and refill them with clean material to serve as the litter or bedding. Generally speaking, the trays are filled by means of a device called a dispenser, so the operator only needs to take action to invert the trays and position them correctly under the dispenser. To speed up and optimise the washing procedure, the above-described tunnel washers of known type normally allow for several trays to be placed simultaneously on the conveyor belt so the operator will have a plurality of clean trays emerging at the outlet from the tunnel washer, that are pushed by the conveyor belt towards the station where they are filled with clean bedding. Here again, to speed up the procedure, the dispensers can normally fill several trays simultaneously because they have several juxtaposed nozzles for delivering the bedding. After inverting the trays, the operator must consequently take care to align them side by side, one after the other, to form a row—generally comprising three or four juxtaposed trays—so that they can be placed underneath the dispenser and filled simultaneously thereby.

In order to optimise and further automate the washing process, devices for automatically inverting the trays coming from the tunnel washer, with no need for any action on the part of the operator, have been designed for use with the washing systems of known type, as described above.

The solutions of known type have several drawbacks, however, particularly because they have a limited reliability and flexibility.

A known and fairly common solution according to the state of the art for inverting the trays coming from the tunnel washer and positioning them correctly under the dispenser consists in positioning a roller bench on a lower level than the roller conveyor serving the tunnel washer so that the trays leaving the tunnel drop by gravity onto said roller bench, normally turning over in the process. This method naturally has some drawbacks, the first of which is that it is ineffectual for a certain percentage of trays that drop by gravity but do not turn over properly, coming to rest on their sides, for instance. A further drawback stems, for example, from the fact that it is necessary to establish a certain difference height between the conveyor belt and the roller bench or table in order to invert the trays, and this exposes the trays to a rather forceful impact with the bench at the end of their fall.

The main drawback of this solution, however, remains the random nature of the inverting operation, such that the operator must often take action to straighten and rearrange the trays on the roller bench. In addition, the height difference between the conveyor belt and the roller bench lower down is generally fixed and, as a result, any differences in the type of tray involved affects the success rate of the inverting operation. A further drawback of said system of known type lies in the poor ergonomics for the operator: because the roller bench is at a lower level than the conveyor belt, the operator collecting the trays is obliged to work in an uncomfortable and unnatural position.

Another system of known type currently used for inverting the trays coming from the tunnel washer and positioning them correctly in line with the nozzles of the bedding dispenser involves a higher level of automation that includes arranging the trays at the outlet from the tunnel washer, aligning them with the aid of a suitable alignment device, one beside the other, to form three or more rows of juxtaposed trays lying crosswise to the forward feed direction of the conveyor belt, carrying them up to a tipping device, picking them up with clamping means and turning them through 180°. The system is scarcely versatile, however, in that the transport system at the tunnel washer outlet tolerates only modest variations to the dimensions of the trays because suitable gripping teeth have to be inserted in the trays in order to push them in the forward feed direction and the tray inverter system cannot be associated with existing tunnel washers without considerable alterations. In addition, the inverter system as a whole is very bulky.

SUMMARY OF THE INVENTION

The main technical aim of the present invention is therefore to produce an automated system for inverting the trays emerging from a tunnel washer and positioning them correctly in line with subsequent stations for filling the trays with new, clean bedding that overcomes the above-described drawbacks that have not been solved by the known systems.

Within the context of this aim, one object of the present invention is to produce a system of devices suitable for being installed within limited spaces and for being associated with the outlet of any tunnel washer machine.

Another, not necessarily last object of the present invention is to produce a system capable of processing trays of different shapes and/or sizes without any need for adjustments, thus proving more versatile than the known systems.

Another object of the present invention is to produce an automated system for inverting and positioning the trays in line with a dispenser device and capable of automatically orienting each tray parallel to the forward feed direction of the conveyor belt and of arranging several trays in a row, lying parallel to one another and crosswise to the forward feed direction so as to optimise the positioning of the trays in the phase in which they are filled by the dispenser.

Another object of the present invention is to produce an automated system that can easily be removed from the washing line, enabling the manual performance of the tray inverting step by an operator in the even of any failure or need for servicing.

This technical aim and these and other objects that will emerge more clearly later on from a detailed description of the present invention, given here as a non-limiting example, are achieved by an automated system for the handling, positioning and spatial orientation of trays for containing lab animals coming from a washing machine, characterised in that it comprises a motor-driven roller bench, a device for inverting said trays, one or more devices for stopping the forward feed of said trays, and one or more sensors located along said motor-driven roller bench and capable of detecting the presence of the trays at several points along said roller bench, a central control unit being capable of operating said tray inverter means and said stoppers as a function of the signals received from said sensors.

BRIEF DESCRIPTION OF THE DRAWINGS

Further characteristics and advantages of the present invention will emerge more clearly from the detailed description below, given as a non-limiting example and illustrated in the attached figures, wherein:

FIG. 3 shows an overall view of the automated system according to the present invention;

FIGS. 3a, 3b and 3c show enlargements of parts of FIG. 3; figures from 4 to 7 show an operating sequence of the automated system according to the present invention.

DETAILED DESCRIPTION OF THE INVENTION

Figure 1:
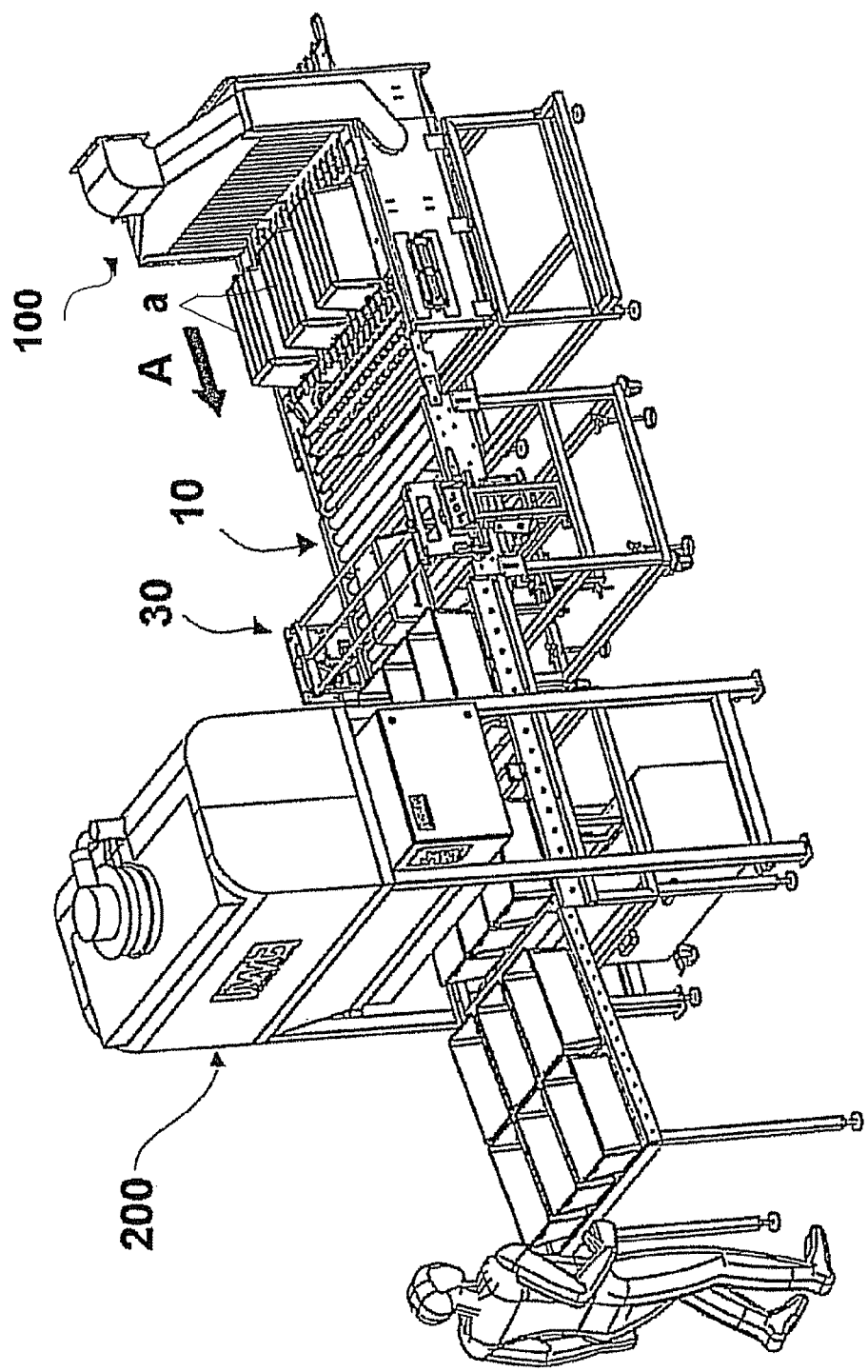
FIG. 1 shows a perspective overall view of a tunnel washer complete with the automated system according to the present invention.
Figure 2:
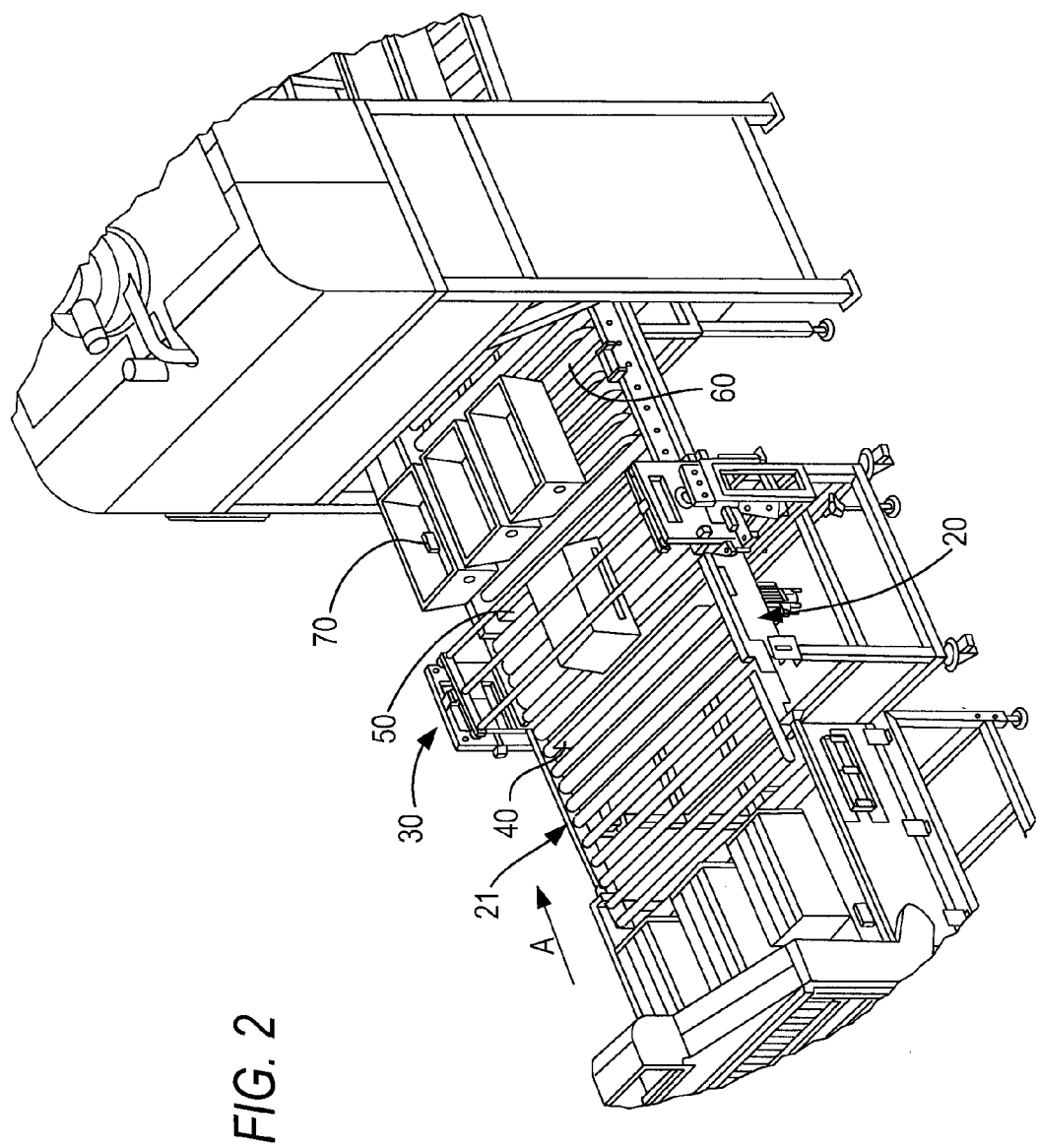
FIG. 2 again shows a perspective view of a detail of FIG. 1, and particularly of the automated system according to the present invention.

With reference now to FIG. 1, in particular, this shows an example of a tunnel washer 100 of a known type according to the state of the art, comprising a conveyor belt that may consist either of a series of rollers or of a belt proper. At the outlet from the tunnel washer, there are three trays a juxtaposed and arranged upside down on the conveyor belt.

At the end of the tunnel washer 100, FIG. 1 also shows the automated system for the handling, positioning and spatial orientation of the trays according to the present invention, generically indicated by the reference number 10.

The system 10 comprises a bench 20 consisting of a load-bearing structure 21 that in turn includes a supporting surface consisting of a plurality of motor-driven rollers 22, said supporting surface consisting of a plurality of motor-driven rollers being able to carry the trays a coming from the tunnel washer 100 and make them move forward in the forward feed direction indicated by the arrow A in the figures.

As mentioned previously, the motor-driven roller bench 20 advantageously consists of a load-bearing structure 21 that supports a plurality of motor-driven rollers 22 for the forward feed of the trays a, and designed to be placed alongside any tunnel washer machine. The load-bearing structure 21 advantageously comprises a frame 24 mounted on wheels 25 so as to enable the whole bench to be removed, in the event of servicing needs or an emergency, without having to interrupt the operation of the tunnel washer, enabling the functions of the system to be implemented manually by an operator in the meantime.

The load-bearing structure 21 can also advantageously comprise a small frame 23 hinged to the main frame 24 for interfacing with the washing machine, again equipped with a plurality of rollers to form a supporting surface for the trays. Basically, the small frame 23 enables the surface for supporting and transporting the trays, consisting of the succession of motor-driven rollers 22, to be extended so that the system 10 forming the object of the present invention can be adapted to tunnel washers with conveyor belts located at different heights off the floor. The rollers supported by the small frame 23 advantageously have a narrower diameter than the diameter of the rollers of the bench 20.

The load-bearing structure 21 also supports a plurality of stopping devices 40, 50, 60. Said stopping devices, or stoppers 40, 50, 60 are designed to block the forward feed of the trays at various points in the system. According to the preferred embodiment shown in the attached figures, each of said stopping devices or stoppers consists of a blade or a portion of a plate arranged crosswise to the forward feed direction A of the trays along the conveyor belt formed by the rollers 22 and with a length substantially corresponding to the width of the conveyor belt, and consequently suitable for intercepting all the trays carried on the conveyor belt.

Each of said stopping devices 40, 50, 60 is connected to an actuator 90, preferably a pneumatic actuator, capable of moving said stopping devices between a working position in which said stopping devices intercept the trays, preventing their forward feed despite the rollers 22 beneath them continuing to turn freely, and a position at rest in which they do not intercept the forward feed of the trays. According to the preferred embodiment in which said stopping devices consist of blades 40, 50 inserted between the rollers 22 on the surface supporting the trays and consequently crosswise to the forward feed direction, their position at rest corresponds to the positioning of the blade underneath the tray supporting surface, while the working position corresponds to the position shown in FIG. 3, for instance, wherein said blade extends upwards from the tray supporting surface identified by the plurality of rollers 22.

The movement of the blades 40, 50 is governed by one or more pneumatic actuators capable of raising and lowering said blades, bringing them from the position at rest into the working position.

The system according to the present invention also includes a plurality of sensors 70 capable of identifying the presence of a tray at a given point on the conveyor belt. In particular, according to the preferred embodiment illustrated herein, each of said sensors consists of a photocell that is capable, when positioned on the edge of said conveyor belt formed by the rollers 22, of detecting when a tray reaches the point where it is located.

The system 10 according to the present invention also includes a device 30 for inverting said trays a.

According to the embodiment of the present invention illustrated herein, said inverter device comprises two substantially parallel plates 30a, 30b connected by a plurality of rods 31a, 31b. Said plates and said rods form a cage-like structure that is associated with the bench 20, supported by a supporting structure 35 for the inverter device such that the rods 31a, 31b are positioned crosswise to the forward feed direction A of the trays and consequently substantially parallel to the longitudinal axis of the rollers 22, while said plates are parallel to the forward feed direction A, and perpendicular to the surface identified by the rollers 22.

The supporting structure 35 for the inverter device is capable of moving vertically in relation to the load-bearing structure 21, governed by a hydraulic piston 80 advantageously positioned underneath said supporting structure and within the overall footprint of the load-bearing structure 21, and slidingly associated with the load-bearing structure 21 by guide means 36 that consist, in this example, of a series of castors.

Figure 3B:
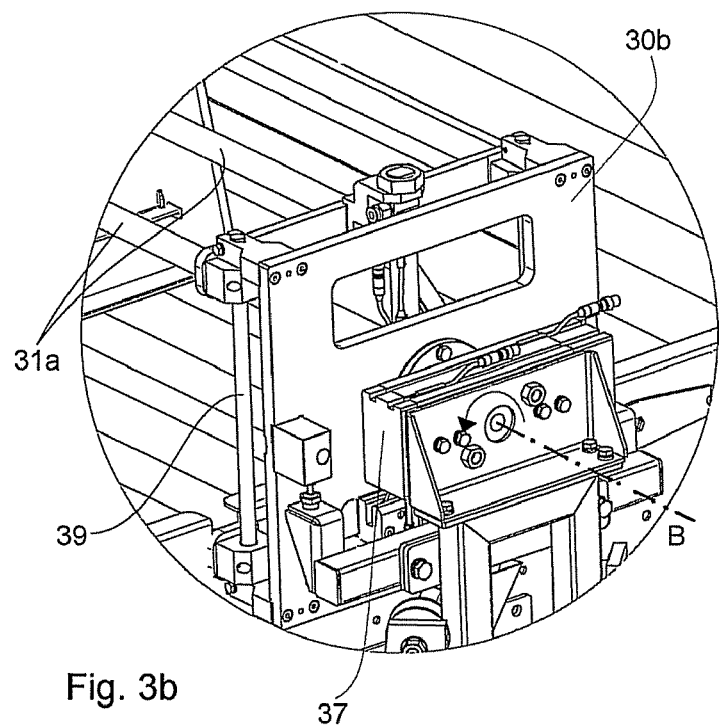
Figure 3C:
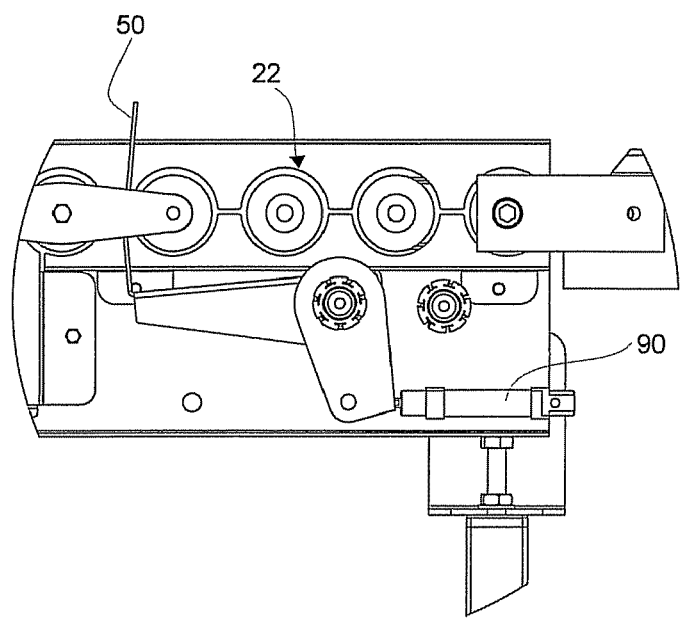

With particular reference to FIGS. 3, 3a and 3b, the rods 31a, 31b are arranged crosswise to the forward feed direction A of said trays and so that two or more rods 31b are coplanar, thereby identifying a first substantially horizontal plane P1, and another two or more rods 31a are coplanar on a second substantially horizontal plane P2 lying above the first and located at a distance X from the first, said distance X being variable with the aid of suitable gripping means 32, 33, 34 designed to adjust the distance X between said two planes P1 and P2 identified by the rods 31a and 31b. In particular, said gripping means comprise a pantograph mechanism 32, 33 operated by an opening/closing cylinder 34 capable of moving the upper rods 31a and lower rods 31b closer together or further apart, thereby varying the distance X between the horizontal planes they identify. More in detail, with particular reference to the enlargement in FIG. 3a, the upper rods 31a are supported by an upper bar 38a, while the lower rods 31b are supported by a lower bar 38b. Said bars are mounted, by means of slides, on the vertical guides 39 that enable the vertical sliding displacement of the bars 38a, 38b induced by the pantograph mechanism and the consequent relative closing together of the rods 31a, 31b.

In particular, according to the preferred embodiment of the present invention described herein, when the inverter device is in the position at rest shown in FIG. 4, the lower rods 31b penetrate the surface of the conveyor belt, coming to occupy the spaces in between the rollers 22 so that each of said lower rods 31b is inserted between two rollers 22 and lies below the plane identified by the rollers so that it does not interfere with the forward feed of the trays that are in motion because they rest on, and are carried forward by said rollers. When the trays are aligned on a line lying crosswise to their forward feed direction, the pantograph mechanism 32, 33 guides the movement for bringing the upper rods 31a and lower rods 31b closer together, said movement being induced by the pneumatic piston 34, thereby reducing the distance X between the planes P1 and P2 identified by the rods and consequently closing the trays a between the rods until another positioning sensor, not shown in the figures, detects the contact of the rods with the trays and stops any further mutual closing movement of the rods. The position of the system is thus as shown in FIG. 5.

Figure 6:
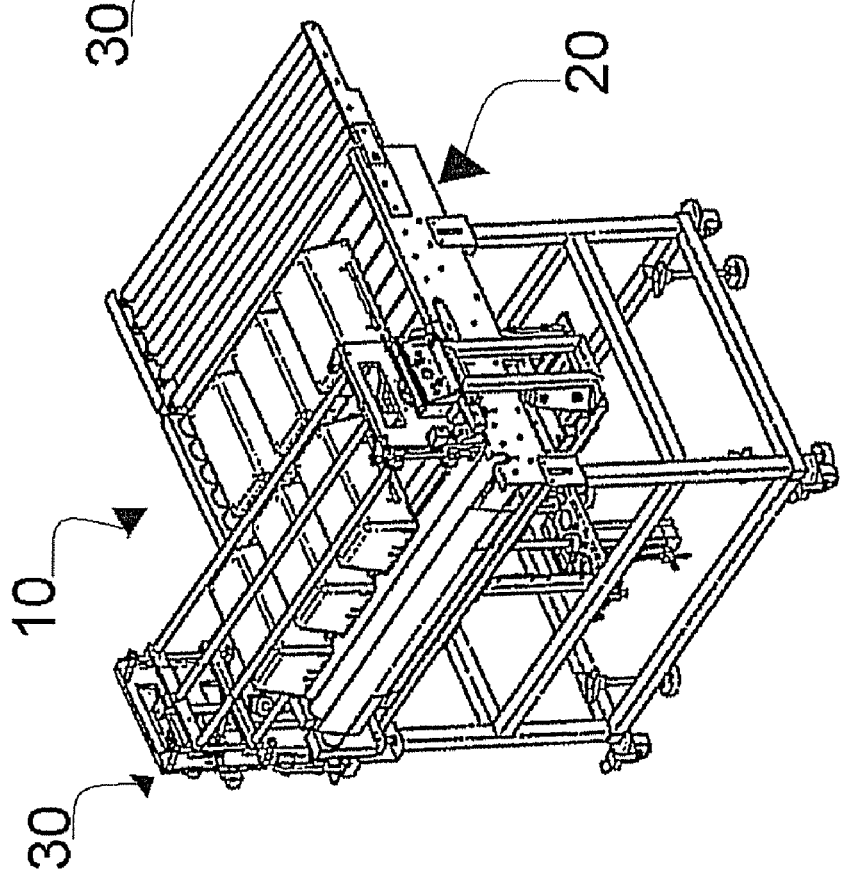

When the trays are closed between the rods and there is no risk of their being displaced from their aligned position, the inverter device 30 connected to the supporting structure 35 is displaced upwards by the hydraulic piston 80, thereby raising the lower rods 31b and the trays a above the surface of the rollers 22 to reach the position shown in FIG. 6.

Figure 7:
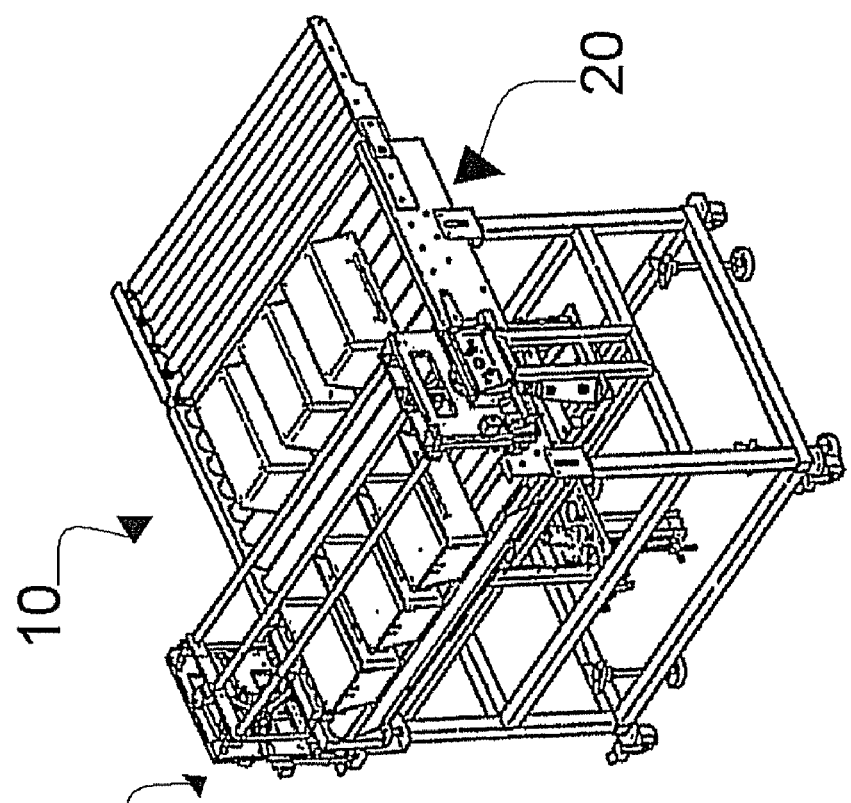

At this point, the cage formed by the plates 30a, 30b and the rods 31a, 31b is rotated around the horizontal axis B crosswise to the forward feed direction, and consequently substantially parallel to the rollers 22, thus inverting the trays contained inside the cage. FIG. 7 shows the system in its final position, in which the inverter device 30 has rotated around the horizontal axis B, inducing a rotation of the trays, and the cage has been reopened by means of the pantograph mechanism 32, 33. The inverter device is rotated by means of at least one rotary actuator 37 interposed between one of the plates 30a, 30b and the supporting structure 35.

The system according to the present invention also comprises a central control unit, not shown in the figures, that receives the signal from the sensors detecting the presence of the trays and governs the actuators of the stopping devices and of the inverter device as a function of the position of the trays on the roller bench.

The operation of the above-described system is as follows.

The trays a emerge from the tunnel washer 100 carried along by the conveyor belt (which may be of any shape) forming part of the tunnel washer. The trays are then carried by the motor-driven rollers 22 of the bench 20 forming part of the system 10 according to the present invention, the small frame 23 hinged to the load-bearing structure 21 of the bench 20 being advantageously designed to link the conveyor belt from the tunnel washer to the surface identified by the rollers 22.

At this point, first tray sensors detect the presence of one or more trays on the bed of rollers 22 and a first stopper 40 intercepts the forward feed of the trays in the direction A, blocking their further movement. The rollers 22 underneath the trays can continue to rotate freely while the trays slide on the rollers but remain in place, held against the stopper 40. This first stopper 40, arranged crosswise to the forward feed direction of the trays, enables the trays to be aligned to form a row, again in the crosswise sense, as shown, for instance, in FIG. 4.

When the trays are aligned against the stopper 40, i.e. after a given time that depends on the speed at which the trays emerge from the tunnel washer, and on the forward feed speed of the trays on the rotating rollers 22, the stopper 40 is lowered below the surface of the rollers and the trays can continue to move towards the inverter device 30. A second sensor located in line with the inverter device 30 or immediately downstream therefrom detects the presence of the trays in line with the inverter device and a second stopper 50 located immediately downstream from the inverter device 30 is enabled so as to stop the forward feed of the trays, keeping them in line with the inverter device (FIG. 5). At the same time, if the first sensors detect the arrival of more trays coming from the tunnel washer, the first stopper 40 is enabled again so that the next trays being delivered are kept waiting upstream from the inverter device, as shown again in FIG. 5.

Then, having checked for the presence of the trays in line with the second sensor, the system—again by means of the central control unit—enables the operation of the inverter device 30. By means of the tray gripping devices comprising the pantograph mechanism 32, 33 and the opening/closing cylinder 34, the rods 31a, 31b move closer together, blocking the trays inside the inverter device. The central unit triggers the upward displacement of the cage supporting structure 35 by enabling the actuator 80, achieving a transfer controlled by position control sensors. The rotary actuator 37 is enabled when the lower rods 31b come to be above the surface of the rollers 22 and there is sufficient space to allow for the cage to rotate. The cage, consisting of the rods 31a, 31b and the plates 30a, 30b thus rotates around the horizontal axis B thereby inverting the trays, and then it is moved downwards again until the lower rods 31b again penetrate under the surface identified by the rollers 22. At this point the system is in the condition shown in FIG. 7.

The system then induces the withdrawal of the second stopper 50 and the trays can continue to be fed forward along the bed of rollers towards the filling station or dispenser 200. A third stopper 60, controlled by a third sensor, can advantageously be provided at any point upstream from the dispenser 200 in order to block the forward feed of the trays before they enter the filling station. The presence of this further stopper enables an operator to compact the trays on one side of the roller bench supporting them so that every tray comes to be exactly in line with a filler nozzle in the dispenser when it enters the filling station.

As an alternative to this manual action by the operator, one or more motor-driven belts can be installed crosswise to the forward feed direction of the trays, located advantageously within the spaces between one motor-driven roller and the next, and consequently penetrating between the rollers 22. These motor-driven belts can thus automatically perform the function of compacting the trays against one side of the roller bed so as to position them correctly in relation to the nozzles in the dispenser.

The trays positioned in this way can then advance towards the dispenser.

It has thus been demonstrated that the automated system for handling containment devices for lab animals according to the present invention achieves the previously stated aim and objects.

In particular, it has been demonstrated that the system forming the object of the present invention enables the automation of the process for handling the trays leaving the tunnel washer, and particularly for inverting them, thereby solving the problems that affect the systems of known type.

In particular, it has been demonstrated that the system according to the present invention is suitable for installation in a limited space and can be combined with different types of tunnel washer, thereby proving extremely versatile.

Moreover, the system according to the present invention has proved even more versatile in that it is able to handle trays of different shapes and sizes with no need for any adjustments.

In addition, it has been demonstrated that the automated system according to the present invention can easily be removed from the washing line, enabling the inverting procedure to be handled manually by an operator in the event of a failure or for servicing needs.

Numerous modifications may be made by a person skilled in the art without departing from the patent-protected scope of the present invention.

The protected scope of the claims shall consequently not be limited by the drawings or by the preferred embodiments illustrated as an example in the above description; instead, the claims shall be deemed to include all the patentable characteristics of novelty deducible from the present invention, including all the features that would be considered as equivalent by a person skilled in the art.

The invention claimed is:

1. An automated system for handling trays for containing laboratory animals coming from a washing machine, wherein it comprises a motor-driven roller bench, a device for inverting said trays, one or more selectively controlled devices for stopping the forward feed of said trays, one or more sensors along said motor-driven roller bench capable of detecting the presence of the trays in line with said sensors, and a central control unit for controlling and coordinating the operation of said tray inverting device and said stopping devices as a function of the signals received from said sensors wherein said tray inverting device comprises two substantially parallel plates connected by a plurality of rods arranged so that at least two or more rods are parallel and coplanar so as to form a first, lower plane substantially parallel to a supporting surface formed by a plurality of motor-driven rollers and another at least two or more parallel and coplanar rods form a second, upper plane substantially parallel to the first lower plane and positioned above the first lower plane at a distance that is adjustable by suitable gripping means, wherein the at least two or more rods of each plane are arranged to be inserted between the plurality of motor-driven rollers of the supporting surface.

2. The automated system of claim 1, wherein said roller bench comprises a load-bearing structure suitable for supporting the plurality of motor-driven rollers designed to form the supporting surface for said trays.

3. The automated system of claim 1, wherein said suitable gripping means include a pantograph mechanism operated by a hydraulic cylinder.

4. The automated system of claim 2, wherein said tray inverting device is connected by means of the plates to a supporting structure, which is associated with said load-bearing structure for said roller bench so that it can move thereon perpendicular to the supporting surface provided by said rollers, such cage structure being arranged so that said rods lie substantially crosswise to the forward feed direction of the trays on the rollers.

5. The automated system of claim 1, wherein said tray inverting device is movable between a first position wherein the rods forming the lower plane penetrate said supporting surface consisting of the rollers, and a second position wherein said rods forming the lower plane are at a greater height above the supporting surface provided by the rollers.

6. The automated system of claim 1, wherein said tray inverting device comprises a rotary actuator designed to turn said device around a horizontal axis crosswise to the forward feed direction of the trays.

7. The automated system of claim 1, wherein that each of said one or more selectively controlled devices for stopping the forward feed of the trays comprises a stopper blade positioned between the rollers and movable between a position at rest, wherein said stopper blade is located underneath the supporting surface provided by the rollers and a working position corresponding to a position wherein said stopper blade extends upwards from the supporting surface provided by the rollers and thus intercepts said trays.

* * * * *